United States Patent [19]

Anderson et al.

[11] Patent Number: 4,570,907
[45] Date of Patent: Feb. 18, 1986

[54] APPARATUS FOR PLACING POINT SUPPORTS ON A METAL CUTTING TABLE

[76] Inventors: Harry E. Anderson, 307 Foxcroft Rd., Pittsburgh, Pa. 15220; Raymond E. Heasley, 38 Silver La., McKees Rocks, Pa. 15136

[21] Appl. No.: 680,165

[22] Filed: Dec. 10, 1984

[51] Int. Cl.[4] .................. B23K 7/02; B23K 7/10
[52] U.S. Cl. ............................... 266/69; 266/60
[58] Field of Search .................... 266/60, 69, 65

[56] References Cited

U.S. PATENT DOCUMENTS

| | | | |
|---|---|---|---|
| 3,770,110 | 11/1973 | Boskovitch | 266/65 |
| 4,067,556 | 1/1978 | Lagerwall et al. | 266/65 |

Primary Examiner—Wayland Stallard
Attorney, Agent, or Firm—Webb, Burden, Robinson & Webb

[57] ABSTRACT

A dispenser unit for use with a cutting machine for cutting metal parts from metal workpieces. The cutting machine has a main beam movable in a first direction which carries at least one cutting torch which is movable along the beam in a second direction substantially perpendicular to the first direction. A cutting table with a planar cutting surface is located below the main beam. The dispenser unit carries a plurality of individual point support members for supporting workpieces to be cut on the cutting table. The dispenser unit includes an elongated tube with an open lower end which is mounted on the main beam for movement along the beam in the second direction. The tube has retractable pins located adjacent the open lower end for selectively depositing individual point support members from the tube onto the cutting surface of the cutting table so that the individual point support members are positioned on the cutting surface of the cutting table to support workpieces according to the size and shape of metal parts to be cut from the workpieces.

16 Claims, 7 Drawing Figures

APPARATUS FOR PLACING POINT SUPPORTS ON A METAL CUTTING TABLE

BACKGROUND OF THE INVENTION

1. Field of the Invention

This invention relates generally at apparatus for cutting metal parts of varying thickness and shapes from workpieces supported on a cutting table and more particularly to an arrangement for supporting the metal workpieces during cutting. Specifically, the workpieces are supported on a plurality of individual point support members which are individually placed on the planar cutting surface of the cutting table in locations dictated by the size and shape of the parts to be cut from the workpieces.

2. Description of the Prior Art

A cutting table for supporting metal workpieces at a cutting station is disclosed in U.S. Pat. No. 4,162,060 where the metal workpieces to be cut are supported on a plurality of spaced parallel burning bars at the top of a water table. After cutting is completed, the slag and scrap resulting therefrom are transferred from the burning bars into a separate container for disposal. In the arrangement disclosed in this United States patent, the water level is raised to a level above the upper surfaces of the metal workpieces for plasma cutting and in close proximity to the lower surfaces of the workpieces for oxyfuel cutting prior to cutting. The water level is lowered after cutting so that the cut metal parts and the slag and scrap may be removed.

Another cutting table for supporting metal workpieces during cutting is disclosed in U.S. Pat. No. 4,453,702. In this patent, the workpieces to be cut rest on spaced parallel burning bars on a dump frame located at the top of a water table. After cutting is completed, the cut metal parts are removed from the burning bars, and the dump frame is tilted to deposit the slag and scrap onto a conveyor. The conveyor transports the slag and scrap from the metal cutting station to disposal means.

In both of the cutting tables described heretofore, the spaced burning bars are in direct contact with the metal workpieces during cutting, and the torch flame or plasma arc contacts the burning bars during cutting. Over a period of time, the top edge of each burning bar is eroded, and slag deposits build up on the sides of the burning bars necessitating replacement of the burning bars which is both time consuming and expensive. In fact, the burning bars are the most expensive items to replace on a cutting table. In addition, each time the flame or arc passes over a burning bar, the quality of the cut on the bottom surface of the part being cut is adversely effected. The elimination of the burning bars from a cutting table avoids these problems.

SUMMARY OF THE INVENTION

The invention comprises supporting metal workpieces on point support members while the workpieces are being cut into parts having the desired thickness and configuration. The point support members are placed directly on the planar surface of the cutting table, and the workpieces are supported thereon during cutting. The point support memers are individually placed on the surface of the table at locations determined by a numerical control microprocessor in accordance with the sizes and shapes of the parts to be cut. The point support members are placed on the cutting surface of the cutting table by a dispenser unit which may be movably supported on the main beam of a standard gantry bridge machine which is located above the cutting table or on a separate beam located above the cutting table. The cutting table may be a water table which has a water-holding tank with means for raising lowering the level of the water relative to the cutting surface of the cutting table and the workpieces resting thereon so that the workpieces are located above or below the surface of the water during cutting as determined by the type of cutting being utilized. After cutting, the water level is lowered, and the cut parts are removed after which the slag and scrap and the point support members are dumped onto a conveyor or into a container. If the same arrangement of parts is to be cut from a plurality of successive workpieces, the point support members may be left in place on the cutting table and successive workpieces placed thereon for the cutting of the parts.

The dispenser unit for placing the point support members on the cutting surface of the cutting table has one or more magazines movably mounted on the main beam or on a separate beam which have the capability of depositing the point support members on the cutting surface of the cutting table at predetermined locations determined by the size and shape of the parts to be cut. The point support members are located on the cutting surface of the cutting table relative to the shape of the parts to be cut so that all of the cut parts will drop free when the cut is completed and the perimeter scrap will remain supported for easy removal from the cutting table. Each piece of scrap is supported by a minimum of three point support members to avoid tie-up on the cutting table. It will be understood that the shape being cut may be directly supported by point support members if desired. Such may be desirable when large shapes are being cut.

In a standard cutting machine, the movement of the cutting torches is determined by controls well known to those skilled in the art. The cutting torches are moved relative to the cutting table in both the X and Y directions. The dispenser unit for placing the point support members in the proper locations on the cutting surface of the cutting table is carried on the main beam and is controlled by the same controls which control the movement of the cutting torches during cutting. Alternatively, the dispenser unit may be supported on a separate bridge and may have its own control panel.

The point support members will ideally be equilateral pyramids so that if they should tip over when they are placed in position on the cutting surface of the cutting table, they will always provide the same dimensional support for the workpieces. However, the point support members may have other shapes so long as the top is smaller than the bottom to permit nesting in the dispenser unit and so long as they are sufficiently stable to retain their position when placed on the cutting surface of the cutting table. The number of point support members to be used is determined by the total weight of the workpieces and the configuration of the parts to be cut from the workpieces. The point support members may be carried away with the scrap and the slag during cleaning of the cutting table and may be disposable.

The individual point support members must be rigid and may be metal or a high strength plastic such as polyethylene. The essential requirement is that the support members have sufficient strength to support the weight of the workpieces to be cut.

The invention will be best understood from a consideration of the following description when taken in conjunction with the accompanying drawings wherein like reference numerals identify like elements throughout.

DESCRIPTION OF THE PREFERRED EMBODIMENTS

Figure 2:
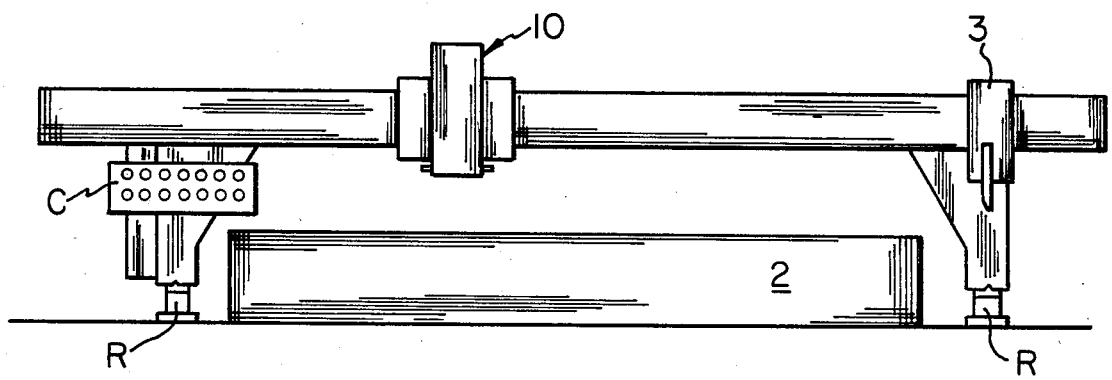
FIG. 2 is a schematic elevation of a bridge type cutting machine with a cutting table located below the main beam and a point support member dispenser unit and cutting torch on the main beam.

FIG. 2 shows a typical gantry type cutting machine having an elongated main beam 1 carried on a frame having wheels at the lower end for movement of the frame along parallel rails R. The beam is located above a cutting table 2 which is a water table. The beam supports one or more cutting torches 3 and at least one movable dispenser unit 10 carrying stacked point support members. The controls for use in the cutting operation and for locating the dispenser unit are in the main control consol C which is mounted on the frame.

An example of a cutting machine with which the invention may be used is the CM-350 shape cutting machine manufactured by the Linde Division of Union Carbide Corporation. The cutting machine may use either oxygen/gas fuel torches or plasma torches for cutting. Control of the cutting is achieved by a Union Carbide UCNC-8 Numerical Control Microprocessor System. The same control system may be programmed to control the placement of the point support members on the cutting surface of the cutting table.

Figure 1:
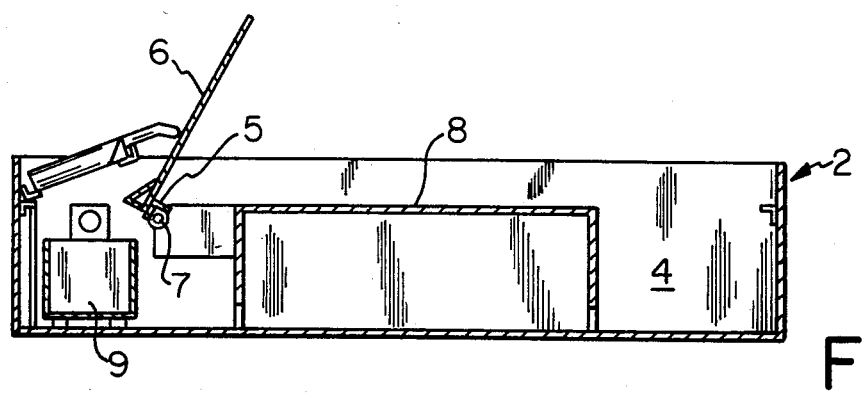
FIG. 1 is a vertical section of a water table which may be used with the cutting machine shown in FIG. 1.

The cutting table used with the invention will generally be a water table which may be constructed in accordance with any one of U.S. Pat. Nos. 3,743,260; 4,162,060; 4,220,318 and 4,453,702. The water table shown in FIG. 1 of the drawings has a water tank 4 with one or more frames 5 located in the upper portion. Each frame 5 has a substantially imperforate planar member 6 attached thereto which forms the cutting surface of the cutting table. The frame is pivoted to the water tank at 7 so that member 6 can be tilted relative to the water tank for discharge of scrap and slag. There is a substantially enclosed air compartment 8 within water tank 4 which communicates with the water in the tank. Air is added to or removed from compartment 8 to adjust the water level in tank 4 in a manner described in U.S. Pat. No. 4,162,060. A container 9 is located at one end of water tank 4 to receive slag, scrap and used point support members at the completion of a cutting operation.

Figure 3:
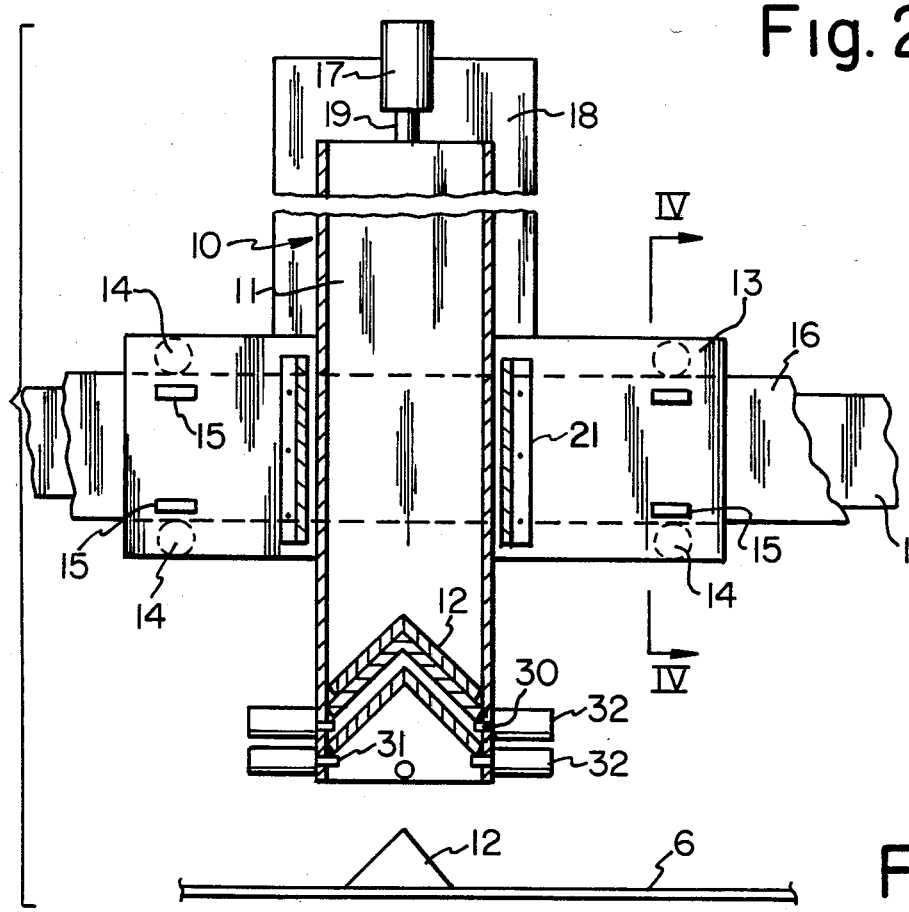
FIG. 3 is a partial vertical section showing a dispenser unit having a single magazine mounted on a cutting machine main beam.
Figure 7:
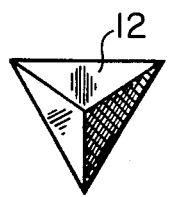
FIG. 7 is a plan view of a point support member in the shape of an equilateral pyramid.

A single dispenser unit 10 carrying a plurality of point support members 12 is shown in FIG. 3 of the drawings and consists of an open ended tube 11 having a transverse cross section the same as the cross section of the base of point support members 12 carried therein. The point support members are nested in the tube and are supported at the lower open end of the tube by a plurality of movable pins which extend into the tube and are located in two different planes as described in detail hereinafter. The dispenser unit is carried on a movable carriage 13 having upper and lower vertical rollers 14 and upper and lower horizontal rollers 15 which ride on a guide plate 16 attached to a vertical face of the main beam 1 to movably support the carriage so that it can be moved longitudinally along the beam to place point support members 12 at the desired X-Y locations on the cutting surface of the cutting table. The tube is supported on carriage 13 by a standard pneumatic cylinder 17 which is attached to a backing plate 18 extending upwardly from carriage 13. A rod 19 extends from the lower end of cylinder 17 and is connected to the outside of tube 11 so that extension of rod 19 from cylinder 17 will lower tube 11 toward the cutting surface of the cutting table, and retraction of rod 19 will raise tube 11. The tube 11 is mounted in spaced slides 21 attached to carriage 13 to permit vertical movement of the tube relative to the carriage. The dispenser unit is positioned along the main beam 1 at the proper X-Y locations determined by the size and shape of the metal parts to be cut from the workpieces at which point tube 11 is lowered by extending rod 19 from cylinder 17 and a point support member is placed on the cutting surface of the cutting table.

The point support members are selectively held in tube 11 by upper pins 30 and lower pins 31 which extend through tube 11 and are sequentially operated to permit the lowermost point support member in the tube to drop into position from the open lower end of tube 11 onto the cutting surface of the cutting table when the tube 11 is properly positioned. Each pin is extended into and retracted from tube 11 by a standard pneumatic cylinder 32 attached to tube 11. The cylinders 32 extend upper pins 30 into tube 11 to detain the nested point support members 12 in the tube above pins 30 when pins 31 are retracted to place a point support member in the proper location on the cutting surface of the cutting table. The cylinders 32 then extend lower pins 31 into the tube, and pins 30 are retracted to permit the lowermost point support member 12 in the stack in the tube to drop onto lower pins 31 to be placed on the cutting surface of the cutting table. Upper pins 30 are then extended into tube 11 by cylinders 32 to support the remaining point support members 12 in the stack in tube 11. In operation with the lowermost point support member resting on lower pins 31 and tube 11 in the raised position, the main beam 1 and the carriage 13 are moved into the X-Y position specified by the shape of the parts to be cut as determined by the microprocessor. When the tube arrives at the indicated location, a signal is generated and the tube moves downwardly, and the lowermost point support member 12 in tube 11 is then dropped onto the cutting surface of the cutting table by retracting lower pins 31 while upper pins 30 are extended into tube 11. When the lowermost point support member is dropped, another signal is generated and the tube is raised for movement to the next X-Y position. The sequence is repeated through the number of operations necessary to complete the program and place all of the point support members required on the cutting surface of the cutting table. When the program is completed, the carriage 13 is moved to its home position at the end of beam 1 to allow the torches to move along the beam.

If desired, a plurality of carriages each carrying a dispenser unit may be operated simultaneously in accordance with control signals generated by the microprocessor system to place point support members on the cutting surface of the cutting table in accordance with the size and shape of the parts to be cut. The use of a plurality of carriages 13 is advantageous when the surface of the cutting table is large in order to speed up the placement of the point support members.

Figure 5:
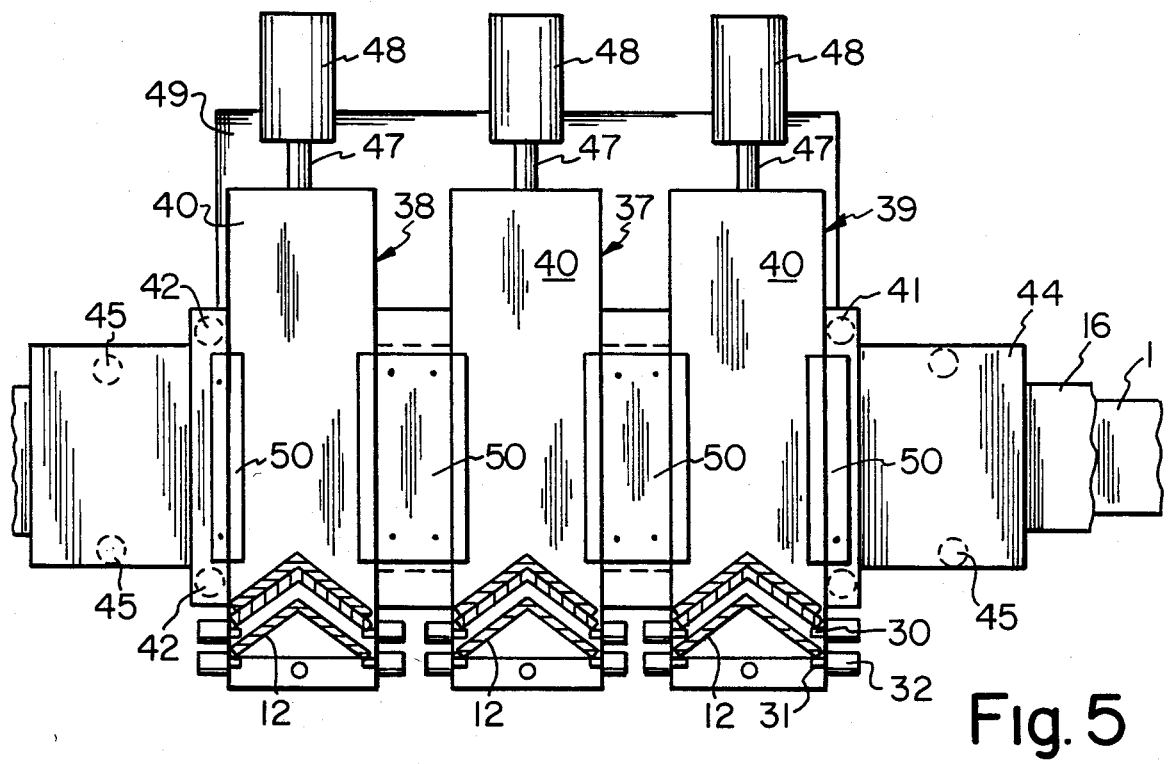
FIG. 5 is an elevation of a modified dispenser unit having three magazines.
Figure 6:
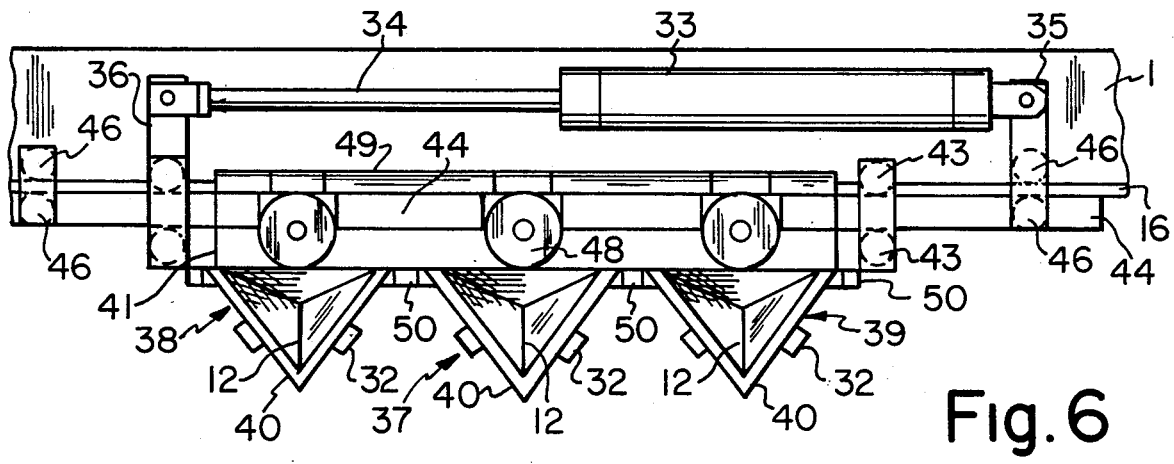
FIG. 6 is a plan view of the dispenser unit shown in FIG. 4.

FIGS. 5 and 6 of the drawings show an arrangement with three separate dispenser units 37, 38 and 39 mounted on an elongated first carriage 41. Each dispenser unit has a tube 40 mounted in spaced sides 50 attached to carriage 41, and carriage 41 has upper and lower vertical rollers 42 and upper and lower horizontal rollers 43 on the ends. The rollers 42 and 43 movably mount first carriage 41 on a main carriage 44 which is movably mounted on guide plate 16 carried on main beam 1 by upper and lower vertical rollers 45 and upper and lower horizontal rollers 46. The first carriage 41 is moved on main carriage 44 by a pneumatic cylinders 33 having a rod 34 extending from one end. Cylinder 33 is pivotally attached to an arm 35 extending rearwardly from main carriage 44, and rod 34 is pivotally attached to an arm 36 extending rearwardly from first carriage 41. Extension and retraction of rod 34 in cylinder 33 moves carriage 41 and dispenser units 37, 38 and 39 along main carriage 44. This arrangement makes it possible for the main carriage 44 to travel along the main beam to initially position the center dispenser unit 37 in position to deposit point support members 12 on the cutting surface 6 of the cutting table. When tube 40 of center dispenser 37 releases its last point support member, a switch is tripped to generate a signal to the microprocessor which then moves first carriage 41 a short distance along main carriage 44 to rapidly position one of outboard dispenser units 38 or 39 on the original center line of empty center dispenser unit 37. The outboard tube is then in position to continue the program and deposit point support members in the desired locations on the cutting surface of the cutting table. The upper end of each tube 40 is attached to a rod 47 extending downwardly from a pneumatic cylinder 48 which is supported on a back plate 49 attached to first carriage 41. Tubes 40 are raised and lowered in the same manner as tube 13 in the embodiment shown in FIG. 3 of the drawings. As will be appreciated by those skilled in the art, the number of individual dispenser units mounted on the first carriage will depend upon the size of the cutting surface of the cutting table and the size and complexity of the parts to be cut from the workpieces.

Figure 4:
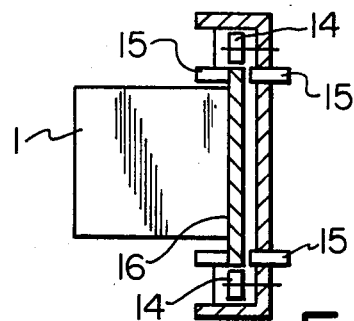
FIG. 4 is a section on line IV—IV of FIG. 3.

In operating the embodiment shown in FIGS. 4 and 5, each dispenser unit is loaded with point support members 12, and the center dispenser unit 37, which is the master dispenser unit, is moved to the zero center line of members on the surface of the cutting table until it is empty. The dispenser unit 37 is operated in the same way as the dispenser unit shown in FIG. 3 of the drawings in respect of the upper pins 30, lower pins 31 and air cylinders 32 for extending and retracting the pins relative to the tube. After the dispenser unit 37 is empty, carriage 41 is moved a short distance on main carriage 44 to place an outboard dispenser unit 38 or 39 on the zero center line of the microprocessor to deposit individual point support members on the surface of the cutting table according to the program. The outboard dispenser unit is utilized until it is empty. At this time, carriage 41 is moved along main carriage 44 to place the other outboard dispenser unit 38 or 39 on the zero center line of the microprocessor so that it can deposit point support members on the cutting surface of the cutting table. In this manner, the zero point of the control program does not have to be changed at any time since the outboard dispenser units are shifted to the normal zero center line of the control program which is coincident with the zero center line of master dispenser unit 37.

The carriage 44 is the main carriage which is controlled by the microprocessor program to properly position the dispenser unit tubes for depositing the point support members, and the carriage 41 is only moved when it is necessary to align the center line of an outboard dispenser unit with the zero center line of the program.

After all of the point support members are in position and the dispenser unit is in its home position at the end of main beam 1, the workpiece or workpieces to be cut are placed on the point support members, and cutting takes place according to known methods. When cutting is completed, the metal plates are removed from the cutting table, and frame 5 is tilted about pivot 7 by a well known arrangement of hydraulic cylinders and rams, and the slag, scrap and point support members are dumped onto a conveyor or into a removable container. Because of the low cost of the point support members, they may be discarded along with the scrap and slag if desired.

A higher quality cut is effected by using individual point support members instead of burning bars because cutting is always carred out over an open non-contact area between the workpieces being cut and the support members therefor. Also, the use of individual point support members decreases the initial expense of building a water table with burning bars and the periodic replacement of the burning bars is eliminated. Additionally, the cutting surface of a cutting table without individual burning bars is more easily cleaned since there are no obstructions to restrict movement of waste materials therefrom. The invention also results in minimizing the possible damage to the cutting machine due to parts tie-up and makes it easier for the operator to walk on the cutting surface of the cutting table when necessary since he does not have to walk between fixed burner bars.

The height of the point support members above the cutting surface of the cutting table will be varied depending upon the thickness of the workpieces to be cut. Thus, when workpieces have a thickness of four inches or less, a four inch spacing between the cutting surface of the cutting table and the bottom surface of the workpieces is adequate, and when workpieces have a thickness in excess of four inches, the point support members should be between four inches and eight inches in height.

While equilateral pyramids are shown as the point support members for the workpieces to be cut, it will be understood that other geometric shapes such as tapered squares, cones and tapered cylinders may also be used as point support members. The only requirements are that all the point support members in the same tube have the same shape so that they can be nested in the tube and have the proper height to space the workpieces the proper distance above the cutting surface of the cutting table.

While preferred embodiments of the invention have been described herein, it is to be understood that the invention may be embodied within the scope of the appended claims.

We claim:

1. In a cutting machine for cutting metal parts from metal workpieces, a main beam forming a gantry, means mounting said main beam for movement along rails in a first direction, at least one cutting torch mounted on said main beam and movable along said main beam in a second direction substantially perpendicular to said first direction and a cutting table having a substantially planar cutting surface located below said main beam, the improvement comprising at least one dispenser unit adapted to carry a plurality of individual point support members for metal workpieces during cutting, said dispenser unit including an elongated tube having an open lower end, first means mounting said tube on said main beam for movement along said main beam in said second direction, second means mounting said tube on said first means for vertical movement relative to said cutting surface of said cutting table, said tube having means adjacent said open lower end for selectively depositing individual point support members on said cutting surface of said cutting table, whereby individual point support members may be deposited on said cutting surface of said cutting table to support workpieces at locations determined by the size and shape of metal parts to be cut from the workpieces.

2. In the cutting machines set forth in claim 1 wherein said first means mounting said tube for movement along said main beam in said second direction is a carriage connected to said tube, said carriage having upper rollers and lower rollers, said rollers riding on said main beam to support said dispenser unit for movement along said main beam in said second direction, whereby movement of said carriage along said main beam moves said tube along said main beam in said second direction.

3. In the cutting machine set forth in claim 1 wherein said second means mounting said tube on said first means for vertical movement relative to said cutting surface of said cutting table is a pneumatic cylinder, a member extending upwardly from said first means and said pneumatic cylinder being attached to said member, a depending movable rod extending from one end of said pneumatic cylinder, the free end of said rod being attached to said tube, whereby extension of said rod from said pneumatic cylinder moves said tube in a downward direction toward said cutting table and retraction of said rod into said pneumatic cylinder moves said tube in an upward direction away from said cutting table.

4. In the cutting machine set forth in claim 1, the transverse cross section of said tube is substantially the same as the transverse cross section of the base of point support members adapted to be carried within said tube.

5. In the cutting machine set forth in claim 1, a set of movable lower pins extending into said tube adjacent said open lower end, a set of movable upper pins located above said set of lower pins and extending into said tube, and a pneumatic cylinder attached to the outside of said tube and to the outer end of each of said movable upper pins and each of said movable lower pins, whereby said pneumatic cylinders extend and retract said pins relative to the interior of said tube.

6. In the cutting machine set forth in claim 5, a point support member resting on said set of lower pins and a point support member resting on said set of upper pins, said point support member resting on said set of upper pins supporting a stack of point support members located in said tube, whereby retraction of said lower set of pins deposits said point support member from the open lower end of said tube onto said cutting surface of said cutting table and retraction of said upper set of pins drops the lowermost point support member in said stack onto said lower set of pins when said lower set of pins are extended into the interior of said tube and places the second lowermost point support member in said stack on said upper set of pins when said upper set of pins are extended into the interior of said tube.

7. In the cutting machine set forth in claim 6, the cross section of the base of each point support member is an equilateral triangle and the transverse cross section of said tube is an equilateral triangle.

8. In the cutting machine set forth in claim 6, each of said point support members is an equilateral pyramid with an open bottom, whereby said point support members may be nested one above the other in said tube.

9. In a cutting machine for cutting metal parts from metal workpieces having a main beam forming a gantry, means mounting said main beam for movement along rails in a first direction, at least one cutting torch mounted on said main beam and movable along said main beam in a second direction substantially perpendicular to said first direction and a cutting table having a substantially planar cutting surface located below said main beam, the improvement comprising at least one movable dispenser unit adapted to carry a plurality of individual point support members, said dispenser unit including an elongated tube having an open lower end, means mounting said tube on said main beam for movement along said main beam in said second direction, said tube having means adjacent said open lower end for selectively depositing individual point support members on said cutting surface of said cutting table, whereby individual point support members may be deposited on said cutting surface of said cutting table to support workpieces at locations determined by the size and shape of metal parts to be cut from the workpieces.

10. In a cutting machine for cutting metal parts from metal workpieces having a main beam forming a gantry, means mounting said main beam for movement along rails in a first direction, at least one cutting torch mounted on said main beam and movable along said main beam in a second direction substantially perpendicular to said first direction and a cutting table having a substantially planar cutting surface located below said main beam, the improvement comprising a plurality of movable dispenser units each of which is adapted to carry a plurality of individual point support members, each of said dispenser units including an elongated tube having an open lower end, means mounting said tubes on said main beam for movement along said main beam in said second direction, each of said tubes having means adjacent said open lower end for selectively depositing individual point support members on said cutting surface of said cutting table, whereby individual point support members may be deposited on said cutting surface of said cutting table to support workpieces at locations determined by the size and shape of metal parts to be cut from the workpieces.

11. In the cutting machine set forth in claim 10 wherein said means mounting said tubes for movement along said main beam in said second direction is a first carriage connected to said tubes and a main carriage having upper rollers and lower rollers, said rollers contacting guide means on said main beam for movement of said main carriage along said main beam in said second direction, said first carriage having upper and lower rollers for movement of said first carriage along said main carriage in said second direction, and means connected to said first carriage and to said main carriage to move said first carriage relative to said main carriage, whereby movement of said main carriage along said main beam moves said first carriage and said tubes in said second direction and movement of said first carriage along said main carriage also moves said tubes in said second direction.

12. In the cutting machine set forth in claim 10 wherein the transverse cross section of each of said tubes is substantially the same as the transverse cross section of the base of point support members adapted to be carried within said tubes.

13. In the cutting machine set forth in claim 10, each of said tubes has a set of movable lower pins extending thereinto adjacent said open lower end and a set of movable upper pins located above said set of lower pins and extending thereinto a pneumatic cylinder attached to the outside of each of said tubes and to each of said movable upper pins and to each of said movable lower pins, whereby said pneumatic cylinders extend and retract said pins relative to the interior of said tubes.

14. In the cutting machine set forth in claim 13, a point support member resting on each set of lower pins and a point support member resting on each set of upper pins, said point support member resting on each set of upper pins supporting a stack of point support members located in each tube, whereby retraction of a lower set of pins drops a point support member from the open lower end of a tube onto said cutting surface of said cutting table and retraction of an upper set of pins in the same tube drops the lowermost point support member in the stack onto the lower set of pins in the same tube when the lower set of pins are extended into the tube and places the second lowermost point support member in the stack on the upper set of pins when the upper set of pins are extended into the tube.

15. In the cutting machine set forth in claim 14, the cross section of the base of each point support member is an equilateral triangle and the transverse cross section of each tube is an equilateral triangle.

16. In the cutting machine set forth in claim 14 wherein each of said point support members is an equilateral pyramid with an open bottom, whereby said point support members may be nested one above the other in each of said tubes.

* * * * *

UNITED STATES PATENT AND TRADEMARK OFFICE
CERTIFICATE OF CORRECTION

PATENT NO. : 4,570,907

DATED : February 18, 1986

INVENTOR(S) : Harry E. Anderson et al.

It is certified that error appears in the above-identified patent and that said Letters Patent is hereby corrected as shown below:

Column 2 Line 6 After "raising" insert —and—.

Column 5 Line 13 "sides" should read —slides—.

Column 5 Line 21 "cylinders" should read —cylinder—.

Column 5 Line 55 After "of" insert —the microprocessor. The dispenser unit 37 then deposits point support—.

Column 6 Line 32 "carred" should read —carried—.

Signed and Sealed this

Thirteenth Day of May 1986

[SEAL]

Attest:

DONALD J. QUIGG

Attesting Officer

Commissioner of Patents and Trademarks